United States Patent [19]

Beckerle et al.

[11] Patent Number: 4,980,411

[45] Date of Patent: Dec. 25, 1990

[54] BINDERS FOR NON-TACKY, NON-SOILING, FLEXIBLE COATINGS

[75] Inventors: Wilhelm F. Beckerle, Bobenheim-Roxheim; Andree Dragon, Limburgerhof; Gernot Franzmann, Bobenheim; Lothar Matthaei, Weisenheim; Eckehardt Wistuba; Helmut Teichmann, both of Bad Duerkheim, all of Fed. Rep. of Germany

[73] Assignee: BASF Aktiengesellschaft, Ludwigshafen, Fed. Rep. of Germany

[21] Appl. No.: 292,311

[22] Filed: Dec. 30, 1988

[30] Foreign Application Priority Data

Jan. 15, 1988 [DE] Fed. Rep. of Germany ....... 3800984

[51] Int. Cl.$^5$ ................... C08L 31/02; C08K 3/22
[52] U.S. Cl. ..................... 524/524; 525/522
[58] Field of Search ............. 525/522; 524/522

[56] References Cited

U.S. PATENT DOCUMENTS 3,847,857 11/1974 Haag et al. ................ 524/533
4,250,070 2/1981 Ley et al. ................... 524/555
4,636,548 1/1987 Kossmann et al. ........... 524/524

FOREIGN PATENT DOCUMENTS 180319  5/1986 European Pat. Off. .
219796  4/1987 European Pat. Off. .
3034171 5/1982 Fed. Rep. of Germany .
2337606 7/1983 Fed. Rep. of Germany .
2005697 4/1979 United Kingdom .

*Primary Examiner*—Joseph L. Schofer
*Assistant Examiner*—Jeffrey T. Smith
*Attorney, Agent, or Firm*—Oblon, Spivak, McClelland, Maier & Neustadt

[57] ABSTRACT

Binders for non-tacky, non-soiling, flexible coatings based on aqueous copolymer dispersions which contain zinc-amine complexes essentially consist of (A) from 99 to 90% by weight of a (meth)acrylate copolymer dispersion whose polymer has a glass transition temperature of from −40° to −1° C. and (B) from 1 to 10% by weight of a water-soluble zinc-amine complex salt of a polymeric carboxylic acid, the percentages by weight being based on the total amount of polymer.

4 Claims, No Drawings

BINDERS FOR NON-TACKY, NON-SOILING, FLEXIBLE COATINGS

The present invention relates to aqueous polymer dispersions which can be used as binders for flexible coatings having little tack and thus little tendency to become soiled.

Flexible coatings are applied vertically on walls and horizontally on roofs to protect the building material and are preferably used for renovating cracked masonry. The coating materials must provide a permanent flexible covering over the cracks, so that water cannot penetrate into the wall or into the roof. Since these materials are used outdoors, the binders used must be water-resistant, resistant to hydrolysis and weather-resistant (UV radiation) and must also be permanently flexible down to temperatures of $-15°$ C. Low-temperature flexibility is usually characterized with the aid of the tensile force and elongation at break at $-10°$ C. Elongation at break or a pigmented coating (pigment volume concentration usually 15-35%) should be about 100%. Because of the required mechanical behavior at low temperatures, the suitable polymers which are present in the binders for these flexible coatings must have low glass transition temperatures in the range to $-20°$ C. This means that the binders which are suitable because of their weather resistance frequently give tacky films which readily become soiled.

Non-tacky, non-soiling films which also have good low temperature flexibility can be obtained with the aid of natural rubber latex or butadiene-containing polymers, but these binders are not UV-stable, i.e. they undergo degradation by weathering, become brittle and chalk; some of the degradation products may even be tacky. Such binders are therefore unsuitable.

There are commercial acrylate-based binders which can be used to prepare photocrosslinkable coatings which have non-tacky surfaces. However, these photocrosslinkable coatings have the disadvantage that, in shadow, for example under roof and balcony projections, they dry in such a way that they remain tacky or are less non-tacky, so that these areas tend to become soiled.

Furthermore, German Published Application DAS No. 2,337,606 has disclosed a corrosion-inhibiting aqueous coating material which contains, in suspension in from 0.2 to 20 mmol/mol of water, a synthetic polymer which is insoluble in water at pH 3-11 and a metal complex, in particular zinc ammonium carbonate, which is insoluble in water. However, because of incompatibility, some films of such coating materials are opaque, and white blooming may occur at high doses. However, this zinc salt crosslinking does not have any considerable effect on the tendency to soil and has not been described for polymers whose glass transition temperatures are from about $-20°$ to $0°$ C.

It is an object of the present invention to provide a binder for flexible coatings which does not have the abovementioned disadvantages.

We have found that this object is achieved and that binders based on aqueous copolymer dispersions which contain zinc-amine complexes are particularly suitable for non-tacky non-soiling and flexible coatings if they essentially consist of (A) from 90 to 99% by weight of an aqueous dispersion of alkyl (meth)acrylate copolymers having a glass transition temperature (Tg) of from $-40°$ to $-1°$ C. and (B) from 1 to 10% by weight of a water-soluble zinc-amine complex salt of a polymeric carboxylic acid, the percentages by weight being based on the total amount of components (A) and (B) in the polymer, and the copolymer of component (A) has a mean particle diameter of from 0.01 to 0 5 $\mu$m.

The aqueous alkyl (meth)acrylate copolymer dispersions which are suitable as component (A) and whose copolymer has a Tg of from $-40°$ to $-1°$ C. and preferably has a mean particle diameter of from 0.01 to 0.5 $\mu$m generally contain not less than 70% by weight, based on the polymer, of copolymerized alkyl (meth)acrylates, which are generally derived from alkanols of 2 to 12, preferably 4 to 8, carbon atoms, such as n-butanol, isobutanol and/or 2-ethylhexanol. Suitable comonomers are vinyl esters, such as vinyl acetate and vinyl propionate, and styrene, methyl methacrylate, cyclohexyl acrylate and methyl acrylate, in amounts of up to 30% by weight, and, if required, up to 18% by weight of acrylonitrile and/or vinyl chloride or vinylidene chloride and, in amounts of from 0.5 to 5, in particular from 0.5 to 4, % by weight, $\alpha$, $\beta$-monoolefinically unsaturated mono- and/or dicarboxylic acids of, in general, 3 to 5 carbon atoms, such as acrylic acid, methacrylic acid, crotonic acid, itaconic acid or maleic acid, as well as their amides, which may be unsubstituted or substituted at the nitrogen atoms, such as acrylamide, methacrylamide, N-methylacrylamide, N-methylmethacrylamide, N-methylolacrylamide and -methacrylamide, maleimide and monoethyl maleate. The copolymers may furthermore contain preferably from 0.5 to 4% by weight of $\alpha$, $\beta$-ethylenically polyunsaturated monomers or $\alpha$, $\beta$-ethylenically unsaturated, carbonyl-containing monomers, such as diacetoneacrylamide and butanone-2-methacrylate, as copolymerized units. From 0.8 to 1.2 equivalents of dihydrazide compounds, such as adipodihydrazide, per equivalent of carbonyl groups can be added to the carbonyl-containing copolymers after their preparation. During film formation, such components (A) form crosslinked films which have greater flexibility and less tendency to become soiled. Of particular interest are dispersions of copolymers of from 70 to 91% by weight of n-butyl acrylate and/or 2-ethylhexyl acrylate, from 28 to 7% by weight of styrene, from 1 to 3% by weight of acrylic and/or methacrylic acid and from 1 to 2.5% by weight of acrylamide and/or methacrylamide. Such copolymers preferably have a Tg of from $-40°$ to $-16°$ C. and can be prepared in a conventional manner. They generally contain the conventional nonionic emulsifiers, such as oxyethylated alkylphenols (EO content 5-30) and may additionally contain up to 80, preferably from 25 to 75, % by weight, based on the total amount of the emulsifiers, of conventional organic emulsifiers, such as sulfated oxyethylated alkylphenols (EO content 5-25) and alkyl sulfates, the total amount of the emulsifiers generally being from 1.5 to 6% by weight, based on the copolymer. In addition, they can contain conventional protective colloids and, if required, further assistants. The dispersions generally have solids contents of from 20 to 60, in particular from 40 to 55, % by weight, and the K values of the copolymers are generally from 35 to 90, measured according to DIN 53,276 in tetrahydrofuran at room temperature. The particularly preferred particle size range is from 0.05 to 0.25 $\mu$m and the viscosities of the 50% strength dispersions are generally from 2,500 to 50, preferably from 2,000 to 100, mPa.s. The pH of the copolymer dispersions to be used according to the invention, after adjustment with NH₃, is in general from 7 to 11, frequently from 8 to 10.

An aqueous solution of zinc-amine complex salt of a polymeric carboxylic acid, whose K value is in general from 8 to 40, preferably from 10 to 25, measured according to DIN 53,726 in tetrahydrofuran at room temperature, is used as component (B). The polymeric carboxylic acid generally contains from 20 to 100% by weight of one or more α, β-monoethylenically unsaturated mono- and/or dicarboxylic acids which, like acrylic acid, methacrylic acid, itaconic acid and maleic anhydride, generally contain 3 to 5 carbon atoms, and from 0 to 80% by weight of other water-insoluble α, β-monoethylenically unsaturated monomers, such as (meth)acrylates which are derived from, for example, alkanols of 1 to 12 carbon atoms, such as methanol, ethanol, isopropanol, n-butanol and/or isobutanol, and styrene and/or acrylonitrile as copolymerised units. Of particular interest are copolymers, which contain, as copolymerized units, from 35 to 60% by weight of acrylic acid and/or methacrylic acid and from 65 to 40% by weight of styrene. Such copolymers preferably have acid numbers of from 210 to 500 mg KOH/g. They can be prepared in a conventional manner by mass or solution polymerization. They are preferably prepared by the process described in German Laid-Open Application DOS 3,034,171. The conversion of the solid copolymers into the dissolved form can be effected by dissolving these resins in ammonia-containing or amine-containing water. Suitable amines for this purpose are alkyl and hydroxyalkylamines, such as ethanolamine, triethanolamine, ethyldimethylamine and triethanolamine; ammonia is preferably used. The ammonia content or amine content is preferably chosen so that the solution contains from 2 to 6 times the molar amount, based on the carboxyl content. In general from 0.8 to 1.2 equivalents, based on the carboxylate groups, of zinc oxide are introduced into this alkaline polymer solution and in general dissolved with stirring at from 10° to 90° C. under atmospheric or superatmospheric pressure.

The novel binders for flexible non-soiling coatings are generally prepared by mixing the component (B), which may have been diluted with water, with component (A), preferably by adding component (B) to component (A) while stirring. It has proven advantageous to add from 0.5 to 4% by weight of glycol ether, for example reaction products of C₁–C₄-alkanols with ethylene oxide and/or propylene oxide, such as butylglycol, butyldiglycol and dipropylene glycol monomethyl ether (isomer mixture), to component (A) before the addition of component (B).

The excess ammonia or the excess amine can, if required, be evaporated off or chemically bound, for example with formaldehyde.

It is particularly surprising that even the novel binders which are prepared from a carboxyl-free component (A) and the component (B) give crosslinked and non-tacky films.

The novel mixtures can be particularly advantageously used as binders for the production of flexible coatings for horizontal and vertical surfaces, such as roof coverings and crack-covering systems, which show little tendency to become soiled. Pigmentation may be effected with the conventional pigments and fillers, the PVC (pigment volume concentration) being in general from 10 to 50%, preferably from 20 to 35%. Suitable fillers are, for example, calcite, dolomite, barite and talc, and an example of a suitable pigment is TiO₂.

Conventional film forming assistants, such as glycol ethers, mineral spirits and esters may be present for film formation, in amounts of from 1 to 5% by weight, based on 50% strength polymer dispersion.

Other assistants are conventional thickeners, for example those based on polyurethane, and the usual antifoams, for example those based on silicone oil or mineral oil.

In the Examples which follow, parts and percentages are by weight and the stated K values were measured according to DIN 53,276 in tetrahydrofuran at room temperature.

EXAMPLE 1

(a) Preparation of the polymeric zinc-amine complex salt 55.8 parts of a 25% strength aqueous ammonia solution are initially taken in a heatable pressure-resistant stirred kettle, and 34.4 parts of a copolymer of 60 parts of styrene and 40 parts of acrylic acid, prepared according to German Laid-Open Application DOS No. 3,034,171 and having a K value of 12, are dissolved therein while stirring. 9.7 parts of zinc oxide (Rotziegel grade) are introduced into the stirred solution, and the kettle is closed and heated to 55° C. After this temperature has been reached, stirring is continued for 3 hours and the kettle is let down and cooled to room temperature. A 45% strength aqueous solution of the polymeric zinc-amine complex is obtained.

(b) Preparation of the flexible binder 96 parts of a 56% strength aqueous dispersion of a copolymer of 40 parts of n-butyl acrylate, 40 parts of ethylhexyl acrylate and 20 parts of styrene are initially taken in a stirred kettle, the said dispersion having been prepared using the following assistants: 3% of acrylic acid, 1% of acrylamide, 1.5% of a C₁₂-alkyl sulfate and 1.5% of oxyethylated octylphenol (degree of oxyethylation: 25). 4 parts of the aqueous solution of the polymeric zinc-amine complex prepared according to (a) are then added in the course of 10 minutes to give a 49.8% strength dispersion whose pH is 9.4 and whose films have the following properties:

| | | |
|---|---|---|
| Water absorption after 24 hours | 16% | (according to DIN 53,495) |
| Tensile force at −10° C. | 13.6 N/mm³ | (according to DIN 53,455) |
| Elongation at break at −10° C. | 410% | |
| Tack of the film at 23° C. | 0–1 | (according to DIN 53,230) |

(c) Production of a flexible coating

The following components are mixed in the stated order, while stirring:

| | |
|---|---|
| Water | 35.0 parts |
| 25% strength aqueous N-polyphosphate solution | 3.0 parts |
| 30% strength aqueous solution of ammonium polyacrylate | 2.0 parts |
| Commerical preservative | 3.0 parts |
| Commerical silicone-based antifoam | 2.0 parts |
| 25% strength aqueous ammonia solution | 2.0 parts |
| Cellulose ether | 3.0 parts |
| Dispersion from Example 1b | 300.0 parts |
| TiO₂ (rutile) | 35.0 parts |

| | | |
|---|---:|---|
| Talc | 40.0 | parts |
| Chalk | 120.0 | parts |
| Lamellar Al silicate | 80.0 | parts |
| Finely divided silica | 5.0 | parts |
| Mineral spirit 180/120° C. | 10.0 | parts |
| Mixture of butyl succinate, glutarate and adipate | 8.0 | parts |
| Silicone-based antifoam | 2.0 | parts |
| Dispersion from Example 1b | 350.0 | parts |

Characteristic data of the flexible coating for a film thickness of 500 μm:
 Tensile force at −10° C.: 9.8 N/mm$^2$
 Elongation at break at −10° C.: 165%
 Soiling* at 23° C.: 1
*10 g of iron oxide black are sieved onto the coating.

EXAMPLE 2

Preparation of the flexible binder 96 parts of a 50% strength aqueous dispersion of a copolymer of 79.5 parts of n-butyl acrylate, 17 parts of styrene, 1.5 parts of acrylamide and 2 parts of diacetoneacrylamide, which contains 1 part of adipodihydrazide and was prepared with the aid of 1.5%, based on polymer, of sulfated and oxyethylated nonylphenol (EO: 25) as emulsifier, are initially taken in a stirred kettle. 4 parts of the zinc-amine complex stated under Example 1a) are added in the course of 10 minutes. A 49.7% strength dispersion whose pH is 9.6 is obtained.

Characteristic data of the 500 μm thick films produced therefrom
 Water absorption after 24 hours: 18%
 Tensile force at −10° C.: 9.2 N/mm$^3$
 Elongation at break at −10° C.: 420%
 Tack of the film at 23° C.: 1

Production of a flexible coating

The formulation described in Example (1c) was used for the preparation.
 Characteristic data of a 500 μm thick film
 Tensile force at −10° C.: 6.5 N/mm$^3$
 Elongation at break at −10° C.: 290%
 Soiling* at 23° C.: 1
* 10 g of iron oxide black are sieved onto the coating.

After storage for 1 hour at 23° C., the iron oxide is shaken off. The surface is wiped 5 times with a moist sponge. The remaining amount of iron oxide black is assessed as soiling.
 0=No adhesion of iron oxide
 5=Very pronounced adhesion (black spot)

Production of a flexible roof covering

| | | |
|---|---:|---|
| Dispersion from Example 2b | 56.7 | parts |
| Polyether derivative of a fatty acid | 1.4 | parts |
| TiO$_2$ (rutile) | 3.4 | parts |
| Chalk | 27.9 | parts |
| Barium sulfate | 10.2 | parts |
| Commercial polyurethane thickener (5% strength aqueous solution) | 0.4 | part |

The dried 500 μm thick roof covering has the following characteristic data:

| | |
|---|---|
| Tensile force at 23° C., dry | 1.90 N/mm$^2$ |
| Tensile force at −10° C., dry | 5.8 N/mm$^2$ |
| Tensile force at −20° C., dry | 11.86 N/mm$^2$ |
| Elongation at break at 23° C., dry | 237% |
| −10° C., dry | 186% |
| −20° C., dry | 70% |

| | |
|---|---|
| Water absorption after 48 hours | 6.3% |
| 96 hours | 9.4% |
| 2 weeks | 22% |
| 4 weeks | 31% |
| Soiling | 0–1 |

EXAMPLE 3

(a) Preparation of the polymeric zinc-amine complex salt 44.75 parts of 25% strength aqueous ammonia solution are initially taken, and 34.4 parts of a copolymer of 60 parts of styrene, 30 parts of acrylic acid and 10 parts of maleic anhydride, having a K value of 15, are dissolved therein, the said copolymer having been prepared according to German Laid-Open Application DOS No. 3,034,171. 8.9 parts of zinc oxide (Rotziegel) are added to this solution, and the procedure is continued as described in Example 1 under (a).

(b) Preparation of the flexible binder 95 parts of a 50% strength aqueous dispersion of a copolymer of 36 parts of 2-ethylhexyl acrylate, 42 parts of n-butyl acrylate and 22 parts of methyl methacrylate, and 2.5% of acrylic acid, prepared with the addition of 1%, based on the amount of monomers, of octylphenol (degree of oxyethylation: 25), are initially taken in a stirred kettle, and 5 parts of the zinc-amine complex described under 3a) are added in the course of 10 minutes.

Characteristic data of a 500 μm thick film of the dispersion:

| | |
|---|---|
| Solids content | 49.7% |
| pH | 9.7 |
| Tensile force at −10° C. | 21 N/mm$^2$ |
| Elongation at break at −10° C. | 190% |
| Water absorption after 24 hours | 25% |
| Tack | 0 (1 J/m$^2$) |

EXAMPLE 4

(a) Preparation of the polymeric zinc-amine complex salt 28 parts of 25% strength aqueous ammonia solution are initially taken, and 34.4 parts of a copolymer of 60 parts of methyl methacrylate, 15 parts of methyl acrylate and 25 parts of acrylic acid are dissolved therein while stirring, the said copolymer having been prepared according to German Laid-Open Application DOS No. 3,034,171. 4.85 parts of zinc oxide (Rotziegel) are introduced into this solution while stirring, and the procedure is continued as described in Example 1 under (a).

(b) Preparation of the flexible binder 6 parts of the zinc-am ne complex according to Example 4(a) are added dropwise to 94 parts of a 50% strength dispersion according to Example 1b in the course of 10 minutes, while stirring. A dispersion having a solids content of 49.6% and a pH of 9.9 is obtained.

Characteristics of a 500 μm thick film prepared therefrom

| | |
|---|---|
| Water absorption after 24 hours | 18% |
| Tensile force at −10° C. | 12.2 N/mm$^2$ |
| Elongation at break at −10° C. | 390 N/mm$^2$ |
| Tack of the film | 0–1 |

COMPARATIVE EXAMPLE A

A 500 μm thick film of the 50% strength polymer dispersion used in Example 1b, without the addition of a polymeric zinc-amine complex, has the following properties:

| Tensile force at −10° C. | 1.2 N/mm² |
| --- | --- |
| Elongation at break at −10° C. | >900% |
| Tack at 23° C. | 5 |

COMPARATIVE EXAMPLE B 4 parts of a tetraminezinc bicarbonate solution are added to 96 parts of the 50% strength polymer dispersion used in Example 1b, while stirring, the said solution having been prepared as follows: 280 parts of 25% strength ammonia, 110 parts of ammonium bicarbonate and 110 parts of zinc oxide were mixed while stirring, the zinc oxide going into solution.

Characteristic data of a 500 μm thick film prepared therefrom:

| Tensile force at −10° C. | 10 N/mm² |
| --- | --- |
| Elongation at break at −10° C. | 530% |
| Water absorption after 24 hours | 12% |
| Tack | 4 (9.2 Jm⁻²) |
| Glass transition temperature | −22° C. |

A coating was prepared from the mixture, using the formulation stated in Example 1c. 500 μm thick film obtained therefrom has the following characteristic data:

| Tensile force at −10° C. | 8.2 N/mm² |
| --- | --- |
| Elongation at break at −10° C. | 140% |
| Soiling | 4-5 |

COMPARATIVE EXAMPLE C

The 50% strength polymer dispersion used in Example 2b, without polymeric zinc-amine complexes, gives films which, in a thickness of 500 μm, have the following properties:

| Tensile force at −10° C. | 9.2 N/mm² |
| --- | --- |
| Elongation at break at −10° C. | 420% |
| Tack at 23° C. | 4-5 |
| Glass transition temperature | −24° C. |
| Water absorption after 24 hours | 18% |

COMPARATIVE EXAMPLE D

A 500 μm thick film produced from the 50% strength polymer dispersion used in Example 3b, without polymeric zinc-amine complex, has the following properties:

| Tensile force at −10° C. | 16 N/mm² |
| --- | --- |
| Elongation at break at −10° C. | 200% |
| Tack | 3 (4.1 J/m²) |
| Water absorption after 24 hours | 20%. |

We claim:

1. A binder for non-tacky, non-soiling, flexible coatings based on an aqueous copolymer dispersion which contains a zinc-amine complex, wherein the said binder consists essentially of:
   (A) from 99 to 90% by weight of a (meth)acrylate copolymer dispersion whose polymer has a glass transition temperature of from −40° to −1° C. and
   (B) from 1 to 10% by weight of a water-soluble zinc-amine complex salt of a polymeric carboxylic acid, whose K value is from 8–40, the percentages by weight being based on the total amount of polymer, wherein the polymer of component (A) contains from 0.5 to 4% by weight of carbonyl-containing monomers as copolymerized units, and component (A) contains from 0.8 to 1.2 equivalents of a dihydrazide compound per equivalent of carbonyl groups of the polymer.

2. A binder as claimed in claim 1, wherein the polymer of component (A) contains from 0.5 to 4% by weight of carboxyl-containing monomers as copolymerized units.

3. A binder as claimed in claim 1, wherein component (a) contains up to 4% by weight of a polyfunctional α,β-ethylenically unsaturated compound as copolymerized units.

4. A binder as claimed in claim 1, wherein said dihydrazide is adipodihydrazide.

* * * * *